(No Model.)
W. P. CHRISSINGER.
AUTOMATIC SPRINKLING SYSTEM.
No. 548,746. Patented Oct. 29, 1895.
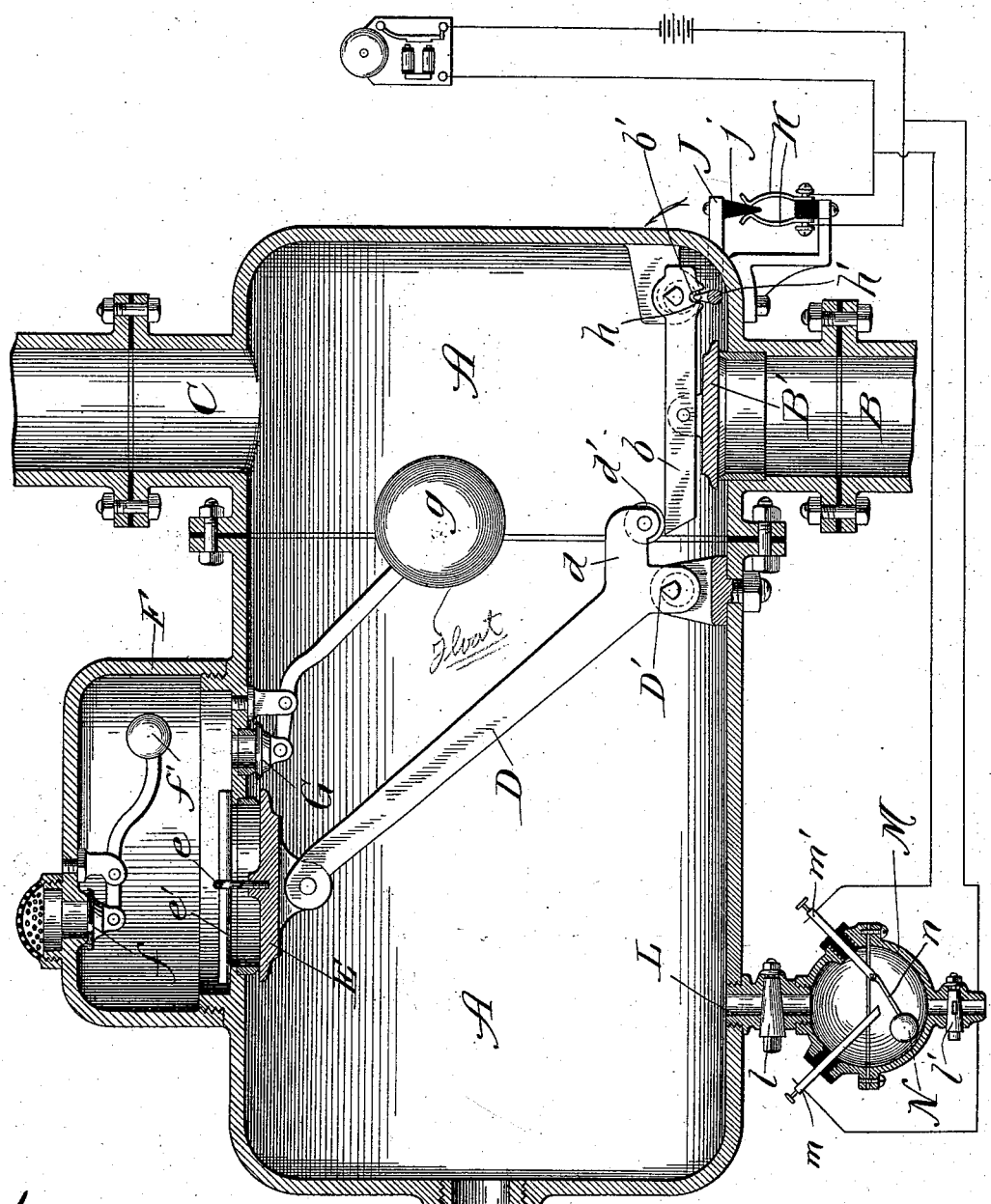
Witnesses:
Chas. E. Gaylord.
Lute J. Alter.
Inventor:
William P. Chrissinger,
By Samuel E. Hibben,
Atty.

UNITED STATES PATENT OFFICE.

WILLIAM P. CHRISSINGER, OF CHICAGO, ILLINOIS, ASSIGNOR OF THREE-EIGHTHS TO CLINTON S. WEEKS AND SAMUEL E. FORSYTHE, OF SAME PLACE.

AUTOMATIC SPRINKLING SYSTEM.

SPECIFICATION forming part of Letters Patent No. 548,746, dated October 29, 1895.

Application filed January 14, 1895. Serial No. 534,870. (No model.)

*To all whom it may concern:*

Be it known that I, WILLIAM P. CHRISSINGER, residing at Chicago, Cook county, Illinois, have invented certain new and useful Improvements in Automatic Sprinkling Systems, of which the following is a specification.

My invention has particular reference and application to that class of automatic sprinkling systems known as the "dry-pipe" system, and has for its object the providing of an automatic valve cheap and simple in construction and positively reliable and efficient in operation. In connection with the valve and its concomitant parts I provide safety or signal devices to make an alarm in case of any derangement of or damage to the parts or any of them.

Many of the present systems often become wholly inoperative on account of a leakage or slight disarrangement of parts, which fact renders them unreliable and ineffectual, as is demonstrated in cases of fire. By my invention I provide for every possible contingency, so that my system is ready to operate under all circumstances, although not in its normal and proper condition.

My invention embodies other novel and advantageous features, which will be apparent in the course of the description, as hereinafter set forth; and my invention consists in the features and details of construction hereinafter described and claimed.

The accompanying drawing represents a sectional view of my device, &c., which consists of a tank or reservoir A of suitable shape and dimensions. Communicating with the interior of this reservoir is a main water-inlet supply-pipe B and an outlet-pipe C, forming the base of a riser to the ordinary dry pipes of the system, having the usual sprinklers arranged in the pipes. The inlet-pipe is normally closed by means of a cap or valve B', which is seated upon the end of such pipe by means of the following valve-controlled mechanism: The valve is pivoted to a horizontal arm b, which in turn is pivoted to one side of the reservoir, preferably upon a knife-edge bearing, in order to minimize friction. It will be understood that the reservoir, when closed by the valves shown, and also the pipe system, are air-tight, there being an air-pressure therein and also in the pipes of from twenty to thirty pounds, supplied from a suitable source through feed-pipe A'. Arranged adjacent to this valve is a long lever D, which is pivoted at D', also upon a knife-edge bearing. Upon the free end of this lever is pivoted a valve E, adapted to close what I will term an "auxiliary" opening in the top of the reservoir. The valve is preferably provided with an eyelet e or other means, whereby the valve may be held in the position shown, as hereinafter set forth. The lever is provided with a short projecting arm d, preferably carrying a roller d', adapted to press upon the upper surface of the free end of the lever b.

A hollow cap F is adapted to be screwed or otherwise secured upon the top of the reservoir and thereby form a small chamber thereabove communicating with the interior of the reservoir. A vacuum-valve f is provided in this cap in order to prevent the formation of a vacuum in the chamber. As shown in the drawing, this valve is normally held upon its seat by means of the weight f'. As shown, I prefer to cover the outlet with a perforated cap to prevent the entrance of dirt and other foreign particles or to prevent tampering with or injury to the valve itself.

A small supplemental valve-opening is made in the top of the reservoir and communicates also with the small chamber above. The opening is normally closed by means of a valve G, arranged upon the short arm of a lever G', which carries upon its other arm a float g of suitable dimensions.

As shown in the drawing, the lever b is provided with a recess b', which engages a lug or projection h upon a rock-shaft h', which extends through a wall of the reservoir and carries at one end an arm J. This arm is provided at its free end with a wedge j, of insulating material, normally adapted to rest between the contact-springs of an ordinary circuit-closer K and thereby to normally keep the circuit open. The terminals are connected to an ordinary electromagnetic bell-circuit, as shown in the drawing.

Entering through the bottom of the reservoir and communicating therewith is a pipe L, to which is screwed or otherwise secured an enlarged chamber M, globular in form or otherwise, the entrance to and from such chamber being regulated by two suitable valves *l l'*. Passing through insulation in the sides of the chamber are the terminals *m m'* of an electric-bell circuit, which may be joined up with the other circuit or have an independent bell and circuit of their own. Preferably upon the free end of one of the terminals I pivot a float N by means of the arm *n*, and inasmuch as the terminals lie in the same vertical plane the rising of the float with its arm will establish an electrical connection and complete the circuit and ring the bell. The object of this signal is to give notice of the presence of water in the reservoir caused by any leakage from the main supply-pipe or otherwise. Any water thus in the reservoir will find its way to the chamber M, the valve *l* being normally open and valve *l'* closed. A small quantity of water will therefore sound an alarm, and the difficulty may be readily adjusted or corrected at its incipiency.

Having set forth the construction of my invention, I will now proceed to describe its operation.

I will assume that the reservoir is under a proper pressure and the parts are in the relative position shown, with the exception of the bar *e'*, which is removed after air-pressure is supplied. The pressure of the air, therefore, holds the valve E upon its seat against its own gravity and the pressure of the water in the supply-pipe acting through the lever *b*. However, when one or more sprinklers open the air will exhaust therethrough. The valve E will no longer remain seated, but will drop downward and thereby release the arm *b*, opening the valve B', thus forming a direct path for the water through the riser and eventually through the sprinkler or sprinklers in a well-known manner. Simultaneously the movement of the lever *b* has raised the insulating-wedge *j* and permitted the flexible contacts to complete the bell-circuit, thereby sounding a bell or sending in an alarm. The incoming water having also filled the reservoir, it is obvious that the alarm in the chamber M will be operated. In order to avoid a vacuum above the valve E, which may prevent or delay its falling, the valve *f* is provided, whose operation is simple and needs no description. After the water-supply is shut off and the system drained the parts are restored to their normal position, in which operation the cap F may be taken off and the valve E raised, after the valve B is seated, until the air-pressure in the reservoir is sufficient to seat valve E, which is held up by any suitable bar or rod *e'*, inserted through the eyelet *e*, after which the bar is removed and the cap screwed in place. If desired, any suitable stop or cushion may be provided to ease the blow of the falling lever-arm.

Whenever water leaks or collects in the reservoir, it will enter the chamber M and sound an alarm; but in case such alarm fails to work or is unnoticed, or should the water enter too rapidly into the reservoir, it will raise the float *g* and open the small valve, whereby the same pressure will be admitted above the valve E, and the lever will consequently fall by reason of its own gravity and the pressure of water against its short arm, and the system will become a wet-pipe system, but nevertheless ready and capable of performing its functions, whereas in many of the present systems, under such conditions, the valves or other parts become locked and inoperative. In my device, therefore, the type of the system may be changed by accident, but there can be no failure of operation whatever under any circumstances.

Although I have described more or less precise forms and details of construction, I do not intend to be understood as limiting myself thereto, as I contemplate changes in form, proportion of parts, substitution of equivalents, as circumstances may suggest or render expedient. It is obvious that many mechanical variations and alterations may be made without departing from the spirit of my invention.

I claim—

1. In a sprinkling system, an automatic valve for admitting water to the system comprising a casing or reservoir under pressure and communicating with the system, a water inlet valve and a lever pivoted within the casing, the lever being supported in a raised position to hold the valve upon its seat when the system is in its normal condition and adapted to fall by virtue of its own gravity when the pressure is reduced, whereby the valve will be opened and water supplied to the system.

2. In a sprinkling system, an automatic valve for admitting water to the system comprising a casing or reservoir under pressure and communicating with the system, a water inlet valve, a lever connected therewith, a second lever pivoted within the casing and having one of its arms normally contacting the first lever to seat the valve, such second lever being normally supported in a raised position when the system is in its normal condition and adapted to fall by virtue of its own gravity when the pressure is reduced whereby as the levers are released from engagement the water inlet valve will be opened and water supplied to the system.

3. In a sprinkling system the combination of a reservoir normally under pressure and provided with an auxiliary opening, water inlet and outlet pipes communicating with the reservoir, a valve normally seated upon the water inlet pipe, a lever connected to said valve, a valve normally closing the auxiliary opening and a second lever connected therewith, the levers being in engagement when the valves are seated and adapted to be disengaged when the fluid pressure is released or reduced.

4. An automatic valve for sprinkling system comprising a reservoir under pressure provided with water inlets and outlets and with an auxiliary opening, valves closing respectively the water inlet and the auxiliary opening, and levers connected to the valves and in engagement when the valves are seated and adapted to be disengaged when the fluid pressure is released.

5. In a dry pipe sprinkling system, an automatic valve for admitting water to the system comprising a reservoir under air pressure and communicating directly with the system, a water inlet pipe, a valve therefor, a supplemental valve, a trip connection between the valves controlled by the pressure within the reservoir and normally holding the valves upon their seats and means for automatically tripping the connection by admitting pressure upon the opposing face of the supplemental valve and thereby equalizing the same.

6. An automatic valve for sprinkling system comprising a reservoir under air pressure provided with an auxiliary opening communicating with an adjacent auxiliary chamber, water inlet and outlet pipes communicating with the reservoir, a valve normally closing the water inlet, a valve normally seated upon the auxiliary opening by the air pressure, a trip connection between the valves normally seating the water inlet valve and a float valve communicating with the auxiliary chamber and adapted to open when water enters the reservoir whereby the pressure upon the auxiliary valve is equalized thereby causing the same to open and thus operate the trip mechanism.

7. In a sprinkling system, an automatic valve consisting of a reservoir normally under pressure and provided with an auxiliary opening, a water inlet and outlet, a valve normally closing the water inlet pipe, a lever connected to the valve, a second valve normally closing the auxiliary opening, a second lever connected therewith, the levers being in engagement when the valves are closed and adapted to be disengaged when the fluid pressure is released or reduced, an electric bell circuit and a connection between the first lever and the circuit whereby as such lever is rocked and the valve opened the circuit will be closed and an alarm or signal given.

8. In a dry pipe sprinkling system, a reservoir A, a water inlet B thereto, an outlet C forming the base of the riser to the system, a valve B', an arm $b$, pivoted thereto, a supplemental valve E closing an opening through a wall of the reservoir, and a lever D pivoted to the supplemental valve and provided with an arm or projection $d$ adapted to contact the arm $b$ when the valves are seated whereby as the levers are disengaged the valves will be opened and water supplied to the system.

9. In a dry pipe sprinkling system, a reservoir A normally under pressure, a water inlet B, an outlet C, a valve B', an arm $b$ pivoted thereto, a supplemental valve E closing an opening through a wall of the reservoir, a lever D pivoted to the supplemental valve and provided with an arm or projection $d$ adapted to contact the arm $b$ when the valves are seated and a valve G for equalizing the pressure upon the supplemental valve whereby as the levers are disengaged the water inlet valve will be opened and water supplied to the system.

WILLIAM P. CHRISSINGER.

Witnesses:
CLINTON S. WEEKS,
SAMUEL E. HIBBEN.